United States Patent [19]
Zalud et al.

[11] Patent Number: 6,064,705
[45] Date of Patent: *May 16, 2000

[54] MANCHESTER ENCODING AND DECODING SYSTEM

[75] Inventors: Peter F. Zalud, Windsor; Robert M. Evans, Cranbury, both of N.J.

[73] Assignee: Sarnoff Corporation, Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,940

[22] Filed: Aug. 20, 1997

[51] Int. Cl.[7] ............................. H03M 7/12; H04L 7/02
[52] U.S. Cl. ........................ 375/361; 375/282; 341/70
[58] Field of Search ..................... 375/282, 361, 375/333, 354, 365, 368; 341/70; 370/509, 514; 371/57.1, 57.2; 714/811, 812

[56] References Cited

U.S. PATENT DOCUMENTS

| | | |
|---|---|---|
| 4,251,801 | 2/1981 | Le Mair et al. .................. 340/147 |
| 4,606,050 | 8/1986 | Sekigawa et al. .................. 375/75 |
| 4,631,695 | 12/1986 | Kozlik ..................... 375/333 |
| 4,853,943 | 8/1989 | Laws ........................... 375/87 |
| 5,030,807 | 7/1991 | Landt et al. ................. 235/375 |
| 5,056,114 | 10/1991 | Wight .......................... 375/87 |
| 5,058,044 | 10/1991 | Stewart et al. .................. 364/551.01 |
| 5,151,977 | 9/1992 | Fredericks et al. ............... 395/200 |
| 5,247,464 | 9/1993 | Curtis ......................... 370/253 |

*Primary Examiner*—Stephen Chin
*Assistant Examiner*—Betsy L. Deppe
*Attorney, Agent, or Firm*—William J. Burke

[57] ABSTRACT

An encoding system including an encoder that Manchester encodes a data value to produce a coded data value and produces a first invalid Manchester encoded sequence as a start of frame. Also produced is a second invalid Manchester encoded sequence as an end of frame. A transmission packet is produced including the start of frame followed by the coded data value followed by the end of frame. The start of frame is a sequence of "110110" and the end of frame is a sequence of "001000".

13 Claims, 7 Drawing Sheets

MANCHESTER ENCODING AND DECODING SYSTEM

FIELD OF THE INVENTION

This invention relates to systems for transmitting data and in particular to a system for encoding and decoding data.

BACKGROUND OF THE INVENTION

As is well known in the art of data transmission and as is described in Simon Haykin, *Communication Systems*, pp. 414–15 (2nd ed. 1983), clock data and the data to be transmitted may be encoded using Manchester encoding to produce a signal which includes both the data to be transmitted and the clock data. This encoding scheme is particularly useful when the transmitter and the receiver are not controlled by the same clock. In this case, the receiver may require the clock data associated with the data to be transmitted in order to recover the transmitted data. A receiver may decode a Manchester encoded signal because it includes both the data to be decoded and the associated clock data in a single transmission. Manchester encoding effectively doubles the bandwidth of the signal to be transmitted.

In addition to the clock data, a receiver needs to identify the beginning and the end of the transmission from the receiver. Systems have been developed which identify the beginning of the encoded data by transmitting an illegal Manchester code. An example of the illegal Manchester code is shown in FIG. 14. Manchester encoded data typically only includes two consecutive high data bits(e.g. "11"). The illegal code includes four consecutive high data bits (e.g. "1111"). As a result, an increased bandwidth transmitter is necessary to transmit the illegal Manchester code. Further, the illegal Manchester code includes three low data bits (e.g. "000"). As a result, the receiver may have difficulty synchronizing its internal clock. Further, the energy of the transmitted signal over a period of time is reduced. As a result, the receiver may increase its gain because of the reduced energy and, thus, reduce its signal to noise ratio.

The end of the transmission may not be identified but determined by monitoring the number of received bits. As a result, if two data packets are transmitted at the same time, it may be difficult to determine if a collision has occurred between the transmissions.

SUMMARY OF THE INVENTION

The present invention provides an encoding scheme and an encoder that Manchester encodes a data value to produce a coded data value and produces a first valid Manchester code encoded in an illegal Manchester sequence as a start of frame code. Also produced is a second valid Manchester code encoded in an illegal Manchester sequence as an end of frame sequence. A transmission packet is produced including the start of frame sequence followed by the coded data value followed by the end of frame sequence. The start of frame sequence is a sequence of "10110" and the end of frame sequence is a sequence of "001000".

The present invention also provides a decoder that receives a Manchester encoded signal including a start of frame sequence followed by coded data values followed by an end of frame sequence. The decoder also includes a detector that detects the start of frame sequence to determine a beginning of the coded data values in the Manchester encoded frame. The detector also detects the end of frame sequence to determine an end of the coded data values in the Manchester encoded frame.

By using the exemplary system, an increased bandwidth transmitter is not necessary to transmit the illegal Manchester code. Further, the RF receiver 305 may synchronize to the received signal because of the continued transitions between high and low data values in the received signal. Further, the energy of the transmitted signal over a period of time is increased. As a result, the RF receiver 305 may decrease its gain improving the signal to noise ratio. In addition, the size of the message packet 400 may be reduced as compared to the prior art because the number of bits in the start of frame sequence and end of frame sequence is reduced.

The present invention further provides a decoder including an integrator. The integrator receives a first signal including a first data value and a second data value different from the first data value. The integrator includes a first counter for increasing a first count value when the first signal includes the first data value and decreasing the first count value when the first signal includes the second data value. The integrator produces a third data value when the first count value is equal to or greater than a first threshold value and a fourth data value when the first count value is equal to or less than a second threshold value. The integrator further produces a second signal including the third data value and the fourth data value. The decoder also includes a discriminator having a second counter that increases a second count value when the second signal includes the third data value and resets the second count value to a predetermined value when the second signal includes the fourth data value. The discriminator also produces a clock synchronization signal when the second count value is equal to or greater than a third threshold value. The decoder also produces a third signal including a fifth data value when the count value is equal to or greater than the first threshold value and a sixth data value when the count value is reset. The first signal is decoded in response to the third signal and the clock synchronization signal.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Overview

Figure 1:
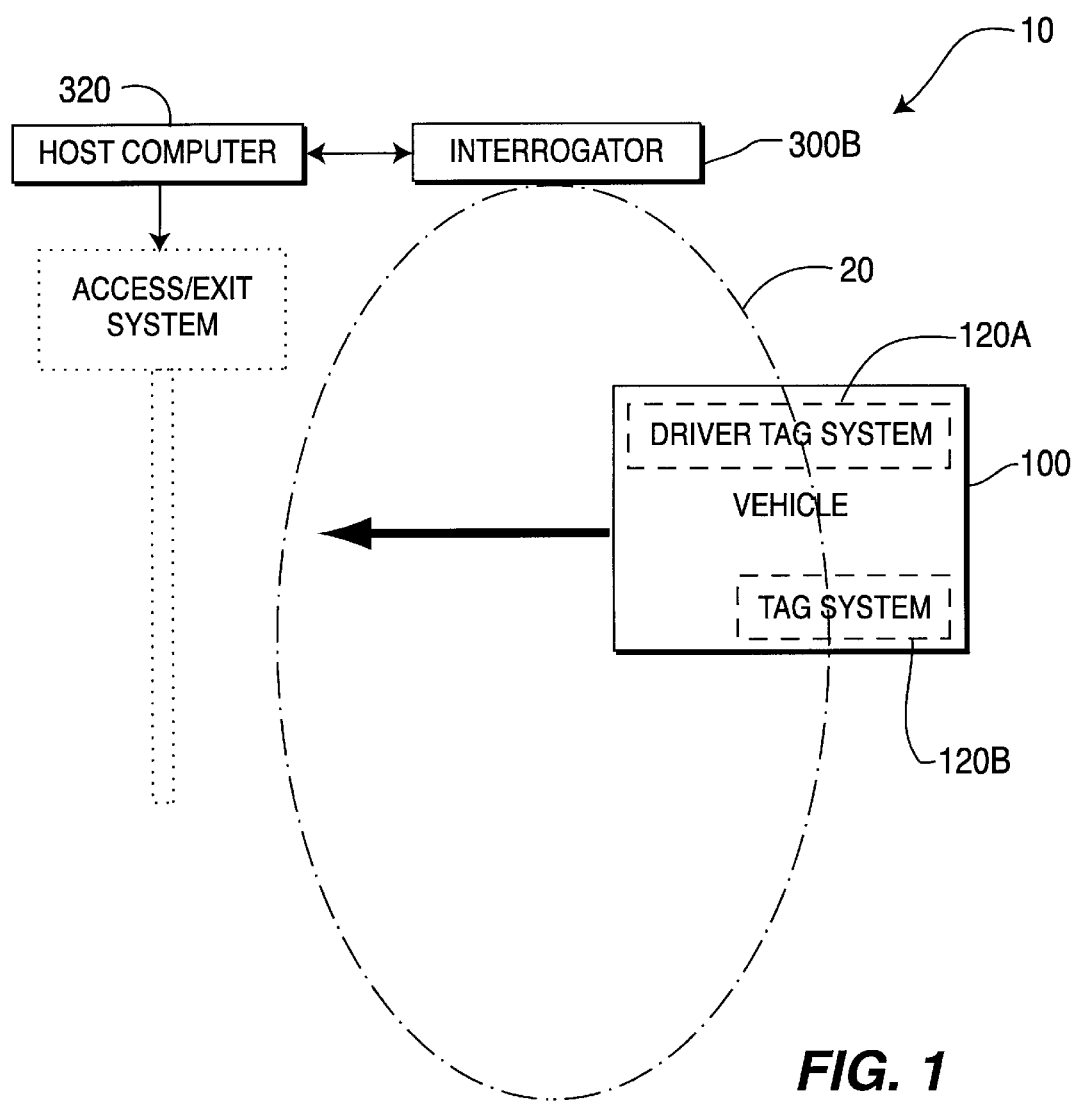
FIG. 1 is a block diagram of a vehicle information system 10 according to an exemplary embodiment of the present invention.

Referring now to the drawing, wherein like reference numerals refer to like elements throughout, FIG. 1 shows a vehicle information system 10 including a tag system 120B mounted in a vehicle 100. The tag system 120B transmits vehicle-related data acquired from the vehicle 100 to an interrogator 300B. The vehicle information system 10 utilizes a bus 110 (shown in FIG. 2) in the vehicle 100 with low-cost RF communications in the tag system 120B and the interrogator 300B to remotely access the vehicle-related data as the vehicle 100 exits or enters a designated area 20. The interrogator 300B provides the vehicle-related data acquired from the tag system 120B to host computer 320.

The vehicle-related data includes, for example, temperature, fluid levels, oil pressure, odometer, and other data related to the vehicle 100. The tag system 120B may also be used to read the status of emissions-related and safety-related parameters without having to directly connect any equipment to the vehicle.

The tag system 120B includes only an RF transmitter 210 (shown in FIG. 3A) for transmitting the vehicle-related data. The interrogator 300B includes only an RF receiver 305 (shown in FIG. 6) for receiving vehicle-related data. As a result, the cost and complexity of the tag system 120B and the interrogator 300B may be reduced because the tag system 120B and the interrogator 300B each do not include circuitry and software to both transmit and receive data. In an alternative embodiment, the tag system 120B and the interrogator 300B may each include a transmitter and receiver for transmitting and receiving data.

The tag system 120B only monitors data transmitted on the bus 110 and, as a result, the control and operation of the bus 110 does not have to be modified to accommodate the tag system 120B. In this way, the tag system 120B may be integrated into the vehicle 100 with minimal modification to the vehicle 100. Thus, the vehicle information system 10 is more likely to be accepted and incorporated into vehicles 100 by vehicle manufacturers. In an alternative embodiment, the tag system 120B may transmit data on the bus 110.

The vehicle information system 10 may be utilized in a variety of environments to remotely monitor vehicles. For example, the vehicle information system 10 may be used to determine the speed of a vehicle. In this case, the tag system 120B repeatedly transmits the speed and vehicle identification data of the vehicle 100 as it travels along a road. An interrogator 300B positioned adjacent to the road receives the transmitted data for subsequent processing.

Alternatively, the vehicle information system may be used to monitor trucks as they leave and arrive at a central terminal. In this case, the interrogator 300B may be located at access points to the central terminal to acquire data transmitted from tag systems 120B coupled to the trucks. The host computer 320 uses the data acquired from the interrogator 300B to determine which trucks have entered and exited the central terminal.

In another alternative embodiment, the vehicle information system 10 may be used in a vehicle rental system. The operation of the vehicle information system 10 is described below in the context of the vehicle rental system.

DESCRIPTION OF THE EXEMPLARY EMBODIMENTS

FIG. 1 shows a vehicle information system 10 including a tag system 120B mounted in vehicle 100. The tag may be mounted in an area not visible to the casual observer. Mounting locations could be any area that is not completely enclosed by metallic surfaces. For example, suitable locations include behind the dashboard in the passenger compartment, behind bumpers, or behind non-metallic body parts, or beneath the vehicle. The vehicle 100 may be, for example, a rental vehicle located at an airport. A person renting the vehicle 100 (hereinafter "the renter") is provided a driver tag system 120A upon his arrival at the airport. The driver tag system 120A includes stored data identifying the renter and the vehicle that has been rented. The driver tag system 120A includes circuitry for transmitting the stored data.

Figure 1A:
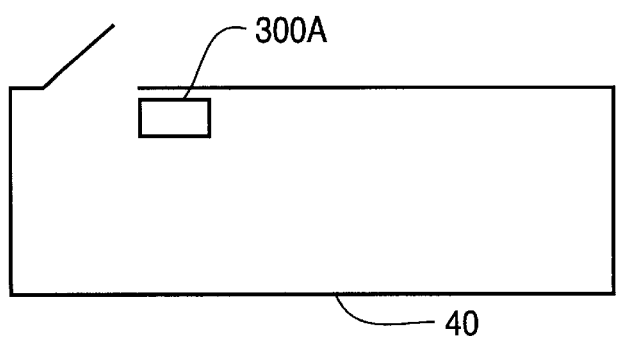
FIG. 1A is a diagram of a shuttle including an interrogator 300A according to an exemplary embodiment of the present invention.

As is shown in FIG. 1A, after receiving the driver tag system 120A, the renter boards a shuttle 40 to travel to the rental lot where the vehicle 100 is located. The shuttle 40 includes an interrogator 300A for acquiring the data transmitted from the driver tag system 120A. The acquired data is transmitted to the host computer 320 which notifies the driver of the shuttle 40 where the vehicle 100 is located in the rental lot. The host computer 320 maintains a database of rental data identifying the renter, the vehicle 100 rented, and other data related to the vehicle 100. For example, the other data may include the location of the vehicle 100 in the rental lot and the fuel level and the odometer reading of the vehicle 100.

Returning to FIG. 1, the renter is dropped by the vehicle 100, enters the vehicle 100, and drives to the exit of the rental lot. The tag system 120B located in the vehicle 100 intermittently transmits message data packets 400 (shown in FIG. 4). The interrogator 300B receives the message packets 400 when the vehicle 100 is in the designated area 20. The size of the designated area 20 may be adjusted by increasing the strength of the signal transmitted from the tag system 120B or increasing the sensitivity of the RF receiver 305 (shown in FIG. 6) in the interrogator 300B. The interrogator 300B has an antenna (not shown) that is oriented so that one or more message packets 400 transmitted from the tag system 120B may be received as the vehicle 100 passes through the designated area 20. The interrogator 300B may be a hand held device or permanently mounted. For each installation, such as an airport, there is a link via radio or hard wired, from the interrogator 300B to the host computer 320.

Figure 4:
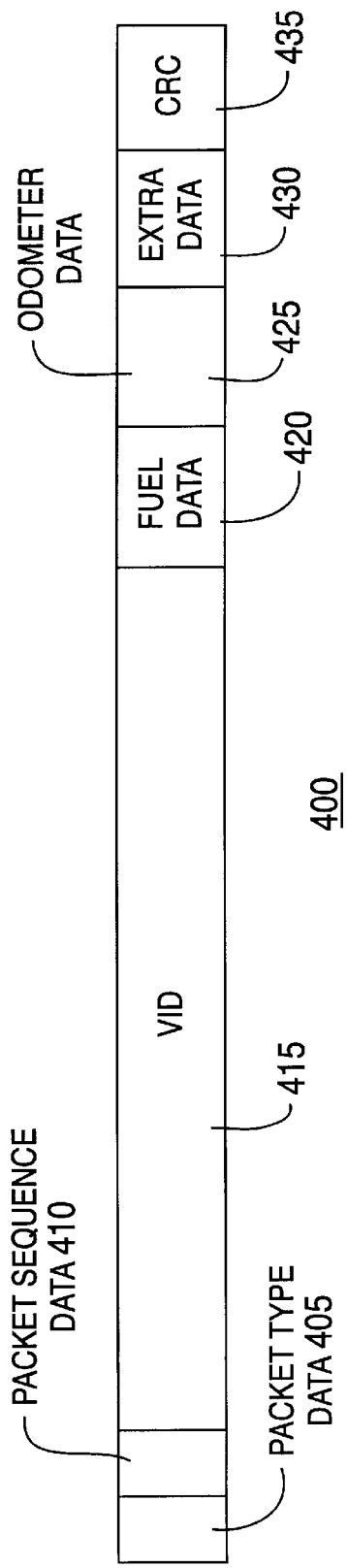
FIG. 4 is a diagram illustrating the contents of a message packet 400 transmitted from the tag system 120B according to an exemplary embodiment of the present invention.

As is shown in FIG. 4, the tag system 120B transmits different types of data in the message packet 400. The message packet 400 includes vehicle identification data (VID) 415 such as a vehicle identification number (VIN) that uniquely identifies the vehicle 100. The message packet 400 may also include vehicle-related data such as fuel data 420 indicating the fuel tank level and odometer data 425 indicating the odometer reading.

Figure 2:
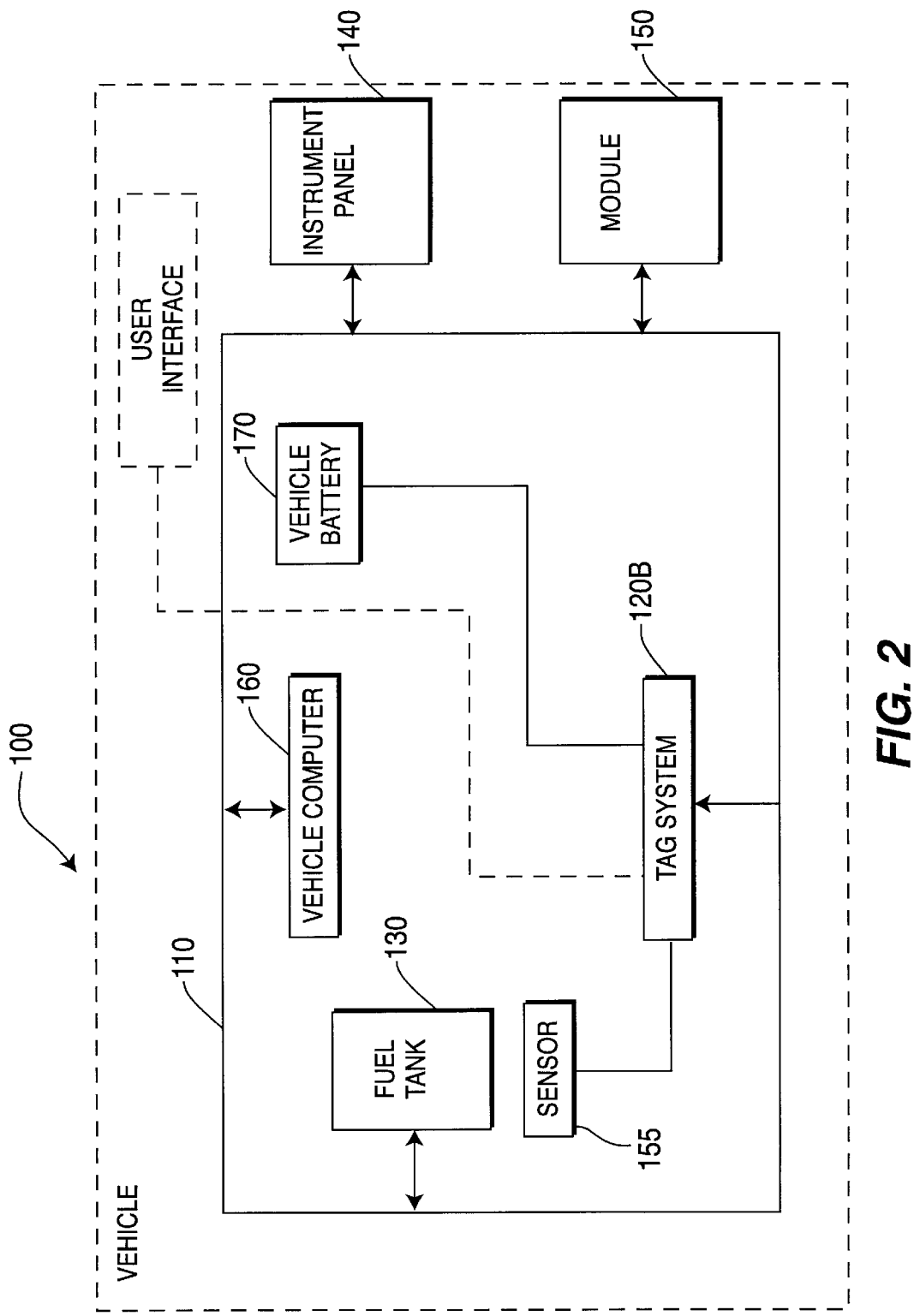
FIG. 2 is a block diagram of a vehicle 100 including a tag system 120B according to an exemplary embodiment of the present invention.

As is shown in FIG. 2, the vehicle 100 includes the tag system 120B. The vehicle 100 includes a bus 10 that is used to transmit data between a fuel tank system 130, an instrument panel 140, other modules 150, and a vehicle computer 160. The module 150 is an interface with other components, for example, the engine (not shown) in the vehicle 100. The vehicle computer 160 may be, for example, the body or engine computer in the vehicle 100.

Data is provided to and retrieved from the bus 110 in accordance with a vehicle bus standard such as the Society of Automotive Engineers (SAE) J1850 standard or the Controller Area Network (CAN) standard. The SAE J1850 standard defines an electrical and data protocol for the bus 100 and the components coupled to the bus such as the fuel tank system 130, the instrument panel 140, the module 150, and the vehicle computer 160. The bus 100 is, for example, a single wire loop. The fuel tank 130, the instrument panel 140, the module 150, and the vehicle computer 160 provide data to or retrieve data from the bus 110.

The inventors have recognized that it may not be advantageous to provide additional components that transmit data on the bus 110. Vehicle manufactures have designed the bus 110 and the components coupled to the data bus 110 to ensure the reliable transmission of data. The addition of components that transmit data on the data bus 110 may require adjustments in the operation of the other components to ensure reliable transmission of data.

The tag system 120B avoids these problems because the tag system 120B only monitors data that is transmitted on the data bus 110. The tag system 120B may be coupled to the bus 110 by, for example, crimping a connector on the wire forming the bus 110 and connecting the connector to the tag system 120B. As a result, the operation of the bus 110 does not have to be modified. In this way, the tag system 120B may be integrated with minimal modification of the vehicle 100. In addition, vehicle manufactures may be more willing to incorporate the tag system 120B in the vehicle 100 because it does not require modification of the bus 110 or the components attached to the bus 110. Further, the installation costs of the tag system 120B are minimized because only minor modifications may be required to install the tag system 120B. In an alternative embodiment, the tag system 120B may transmit data on the bus 110.

The tag system 120B determines the status of different components attached to the bus 110 by monitoring the data transmitted from those components on the bus 110. For example, the fuel tank system 130 includes circuitry for determining the fuel level in the fuel tank as is well known and transmits this data on the bus 110 for subsequent display on a level gauge (not shown) in the instrument panel 140. The tag system 120B retrieves the transmitted data from the bus 110 and transmits the fuel level to the interrogator 300B. As a result, the tag system 120B may provide the fuel level without using any specialized circuitry for monitoring the fuel level or directly coupling the tag system 120B to the circuitry that measures the fuel level.

The tag system 120B may also be coupled to different components in the vehicle 100. As is described in greater detail below, the tag system 120B may include, for example, circuitry for determining the odometer reading of the automobile by monitoring data provided from a wheel sensor.

Figure 3A:
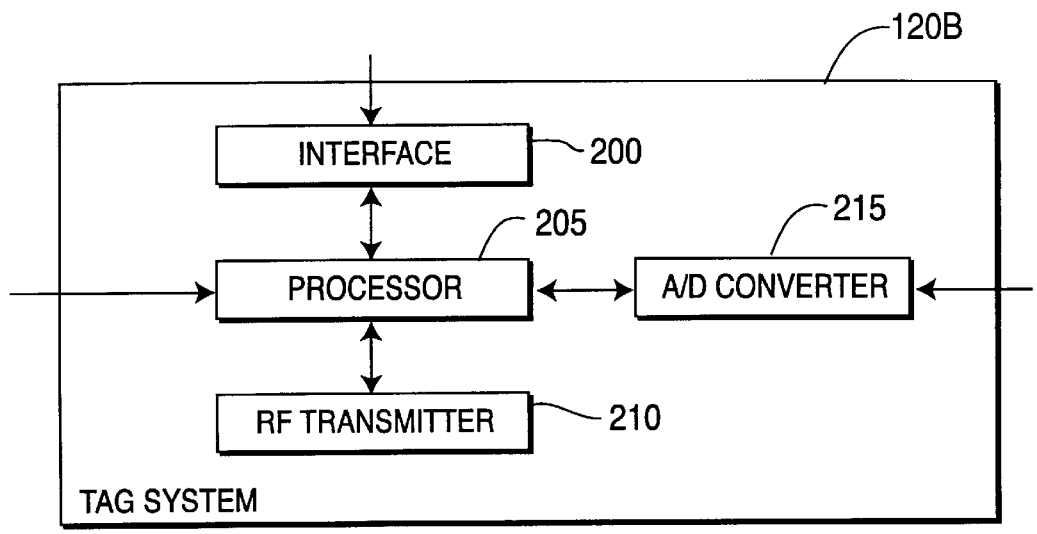
FIG. 3A is a block diagram of the tag system 120B according to an exemplary embodiment of the present invention.

The tag system 120B is described in greater detail below with reference to FIG. 3A. The tag system 120B includes an interface 200 that is compliant with the SAE J1850 standard and provides an interface between the tag system 120B and the bus 110. The interface 200 is coupled to the bus 110 and only retrieves data from the bus 110. Alternatively, the interface 200 may provide data to the bus 110. Data that is transmitted on the bus 110 by the components coupled to the bus 110 includes identification data that identifies which component transmitted the data on the bus 110. For example, the fuel tank system 130 (shown in FIG. 2) transmits a data packet on the bus 110 that indicates that the data was transmitted from the fuel tank 130. In addition, the data packet may include data indicating the amount of fuel in the fuel tank. Further, the data packet may include data indicating which of the other components coupled to the bus 110 should receive the transmitted data packet. For example, the data packet may include data indicating that the instrument panel 140 should retrieve the transmitted data packet from the fuel tank system 130.

The data acquired from the bus 110 is provided to processor 205 which is, for example, a micro-controller. The interface 200 and the processor 205 may be combined as a single component. One such exemplary combination of the interface 200 and the processor 205 is part number MC68HC05V7 available from Motorola. This particular part is compatible with General Motors automobiles compliant with the SAE J1850 standard. The operation of the processor 205 is described below with reference to FIG. 3B.

Figure 3B:
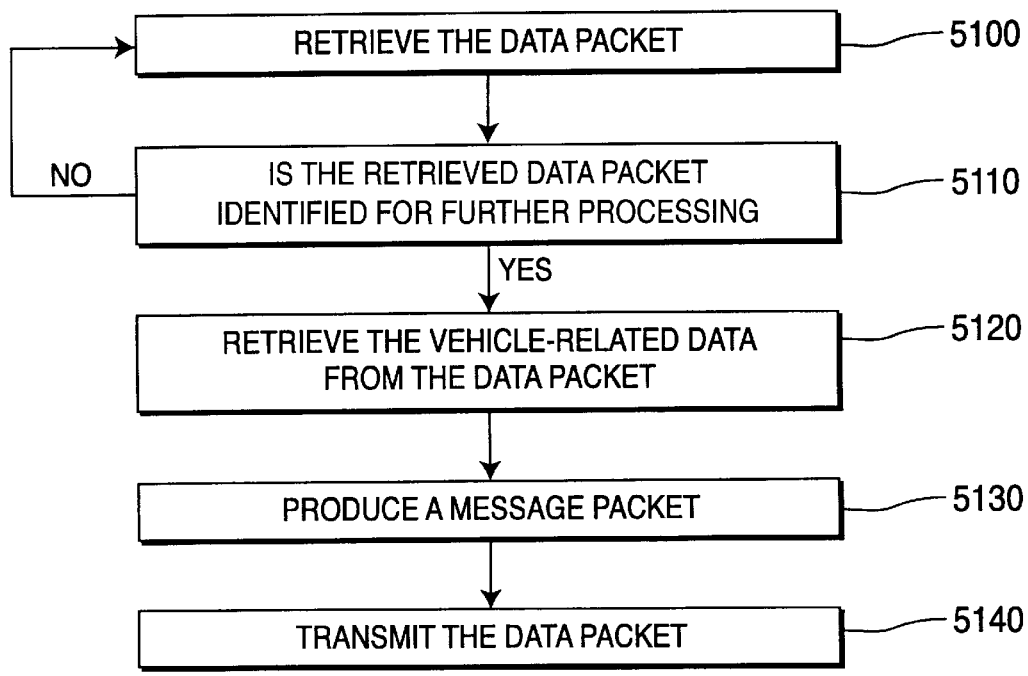
FIG. 3B is a flow chart diagram useful for illustrating the operation of the processor 205.

As is shown in FIG. 3B, at step S100, the data packets are retrieved from the bus 110 and provided to the processor 205. At step S110, the processor 205 determines if the retrieved data packet is to be further processed. If not, step S100 is repeated. The processor 205 determines whether the bus data packet is to be further processed by examining the identification data of the data packet. For example, if the data packet is from the fuel tank system 130, the processor 205 selects this data packet for further processing. The processor 205 does not further process the data packet if it is from, for example, the vehicle computer 160. Which data packets are to be processed can be determined using a lookup table (LUT) (not shown) provided in the processor 205. The LUT may include data indicating the data packets to be selected for further processing. For example, the LUT may include data indicting that data packets from the fuel tank system 130 and the instrument panel 140 should be selected for further processing.

The processor 205 may also receive data from an analog-to-digital (A/D) converter 215 (shown in FIG. 3A) which is coupled directly to a component in the vehicle 100. For example, the A/D converter 215 may be coupled directly to a sensor 155 that measures the fuel level as is described in the U.S. Pat. No. 5,058,044 patent and which is not coupled to the bus 110. In this case, the A/D converter 215 converts the analog signals from the sensor 155 to digital signals for further processing by the processor 205. The processor 205 determines the fuel level based on the fuel sensor readings. Alternatively, the processor 205 may recover data from other components in the vehicle 100 that do not require conversion by the A/D converter 215. In other words, the components may provided digital data directly to the tag system. In this case, these components would be coupled directly to the processor 205.

Returning to FIG. 3B, at step S120, the vehicle-related data is retrieved from the data packet. At step S130, the processor 205 produces a message packet 400 (shown in FIG. 4). At step S140, the processor 205 modulates the RF transmitter 210 to transmit the message packet 400. The RF transmitter 210 is, for example, an AM surface acoustic wave (SAW) transmitter. The modulated signal is produced by the processor 205 turning the transmitter 210 on and off.

The RF link between the tag system 120B and the interrogator 300B may be implemented using either active or "semi-active" transmission technology. In active transmission systems, the tag system 1208 uses a battery 170 (shown in FIG. 2) to power the entire tag system 120B. In a semi-active transmission system, the tag system 120B uses battery power for the tag system 120B except for the transmitter 210. Message packets 400 may be transmitted between the tag system 120B and the interrogator 300B via passive backscatter where a constant wave is transmitted from the interrogator 300B, passively modulated, and reflected back from the tag system 120B to the interrogator 300B as is known.

The RF link may provide either one-way, the tag system 120B to the interrogator 300, or two way communication. A one way link provides a monitoring function where the tag system 120B reports current condition of all monitored parameters of the vehicle 100 as described above. A two-way link allows the interrogator 300B to send messages to the tag system 120B to either command the tag system 120B to monitor certain parameters, or to pass parameters to systems in the vehicle 100. In the latter case, the link may provide the means to remotely perform functions such as lock/unlock doors and monitor/adjust emission control sensors and systems.

Figure 5:
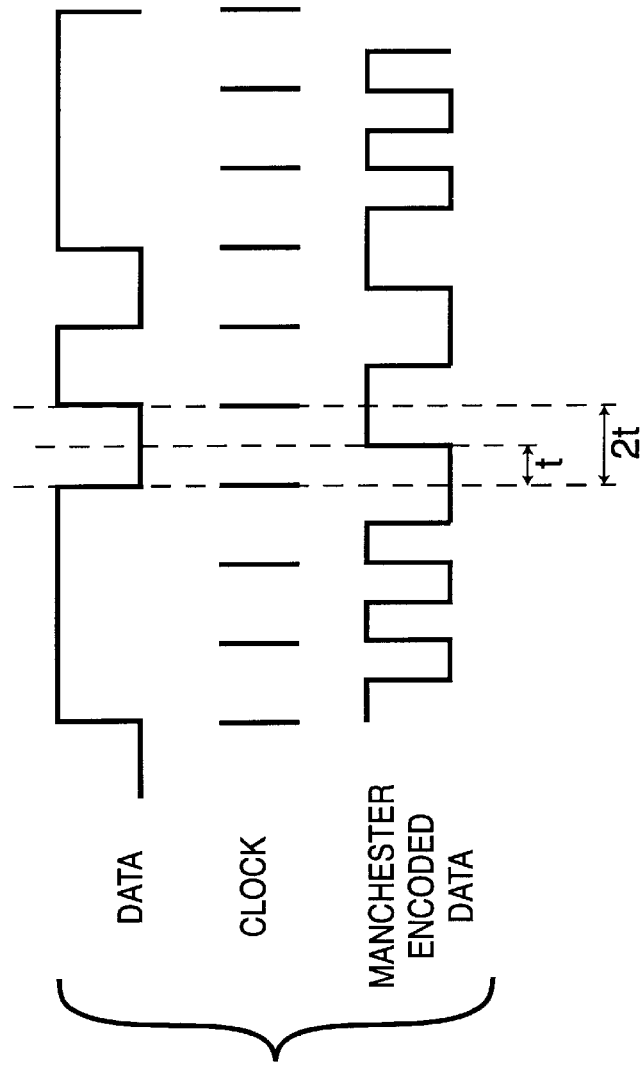
FIG. 5 is a timing diagram illustrating Manchester encoding.

As is shown in FIG. 5, the RF transmitter 210 is modulated using Manchester encoding. As is well known in the art of data transmission and as is described in Simon Haykin, *Communication Systems*, pp. 414–15 (2nd ed. 1983), clock data and the data to be transmitted may be encoded using Manchester encoding to produce a signal which includes both the message packet 400 and the clock data. The width 2t of the data pulses to be encoded is twice the width t of the Manchester encoded data. As a result, the Manchester encoding effectively doubles the bandwidth of the signal to be transmitted. As is described in greater detail below, the integrator 300B recovers both the clock data and the data from the Manchester encoded signal.

As is shown in FIG. 4, the processor 205 can transmit one or more message packets 400 including data for different components in the vehicle 100 (shown in FIG. 1). The message packet 400 includes packet type data 405 that indicates whether the message packet 400 is a single message packet or one of a sequence of related message packets. The packet sequence data 410 indicates the position of the message packet 400 in the sequence of related message packets. Related message packets 400 are provided to reduce the size of the message packets. The size of the message packet 400 is decreased to provide for transmissions from a number of different tag systems 120B.

In order to the reduce the complexity and cost of the tag systems, the number of frequencies for transmission may be limited and may be, for example, one frequency. Thus, in environments where there are a number of vehicles 100 including tag systems 120B, the packet size is reduced to minimize the time for transmitting the message packet 400. In this way, the likelihood of more than packet 400 being transmitted at one time is reduced. By separating large data transmissions into multiple packets 400 interference is reduced.

A sequence of message packets 400 may be used to provide data relating to the vehicle 100 that include more bits than are provided in a single message packet 400. The packet type data 405 and the packet sequence data 410 are, for example, each one (1) byte. The message packet 400 may also include vehicle identification data (VID) which may be a unique sequence of numbers, letters, or symbols used to identify a particular vehicle 100. For example, the VID 415 may be the vehicle identification number (VIN). The VID 415 is, for example, thirteen (13) bytes. A compression algorithm may be used in order to reduce the number of bits in the VID 415.

Data related to the vehicle 100 is also provided in the message packet 400. For example, the message packet includes fuel data 420 and odometer data 425. The fuel data 420 indicates the amount of remaining fuel in the fuel tank of the vehicle 100. The odometer data indicates the current mileage the vehicle 100 has traveled. The fuel data 420 and the odometer data 425 each are, for example, two (2) bytes. Extra data 430 may be contained in the message packet 400 for providing additional data regarding the vehicle 100. The extra data 430 may include, for example, data indicating the status of the engine or whether the vehicle 100 has been in an collision. For the case where the vehicle 100 has been in a collision, the tag system 120B receives data from one or more sensors (e.g. accelerometer (not shown)) in the vehicle 100 that detect impacts to the vehicle 100. The extra data 430 may also include information regarding the rental of the vehicle 100. The message packet 400 also includes an error correction code 435 which is, for example, two (2) bytes. The message packet 400 may also transmit only VID 415. In this case, the tag system may not be coupled to the bus 110.

Figure 7:
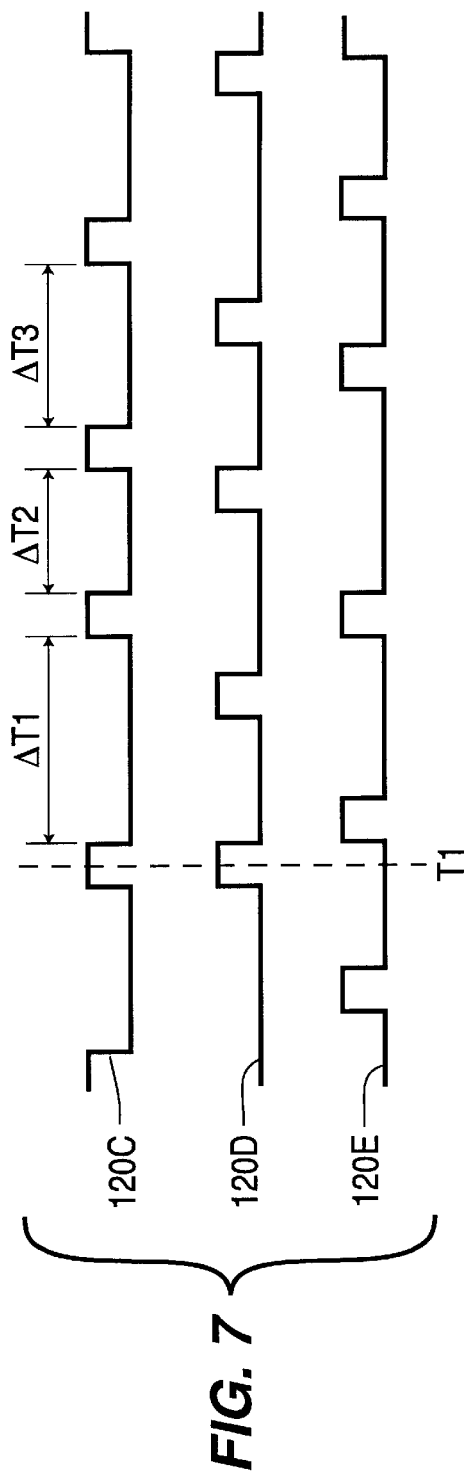
FIG. 7 is a timing diagram illustrating the transmission of message packets 400 from different tag systems 120C–120E according to an exemplary embodiment of the present invention.

The message packet 400 is transmitted from the tag system 120B in a range of zero (0) to X seconds where X is, for example, one half (½). Further, the message packets 400 are transmitted one (1) to two (2) percent of the time. The message packets 400 are also transmitted during one of Y time slots. For example, consider FIG. 7 which illustrates the message packets 400 transmitted from three different tag systems 120C, 120D, and 120E which are the same as the tag system 120B.

As is describe above, a collision between the message packets 400 is minimized by reducing the size of the message packets 400. As is shown at time T1, however, two of the message packets 400 may be transmitted at the same time from two different tag systems 120C and 120D. In this case, the interrogator 300B receives segments of two message packets and, as a result, determines that the received transmission is invalid. The operation of the interrogator 300B when receiving message packets 400 is described in greater detail below. If the message packets 400 where transmitted at a constant time interval from each tag system 120C and 120D, then the message packets 400 from each tag system 120C and 120D would continually be transmitted at the same time.

Figure 8:
FIG. 8 is a data diagram illustrating the time intervals in which the message packets 400 are transmitted from the tag system 120B.

In order to avoid this problem, the exemplary processor 205 (shown in FIG. 3A) may transmit the message packets in one of sixteen random time slots S1–S16 shown in FIG. 8. The time slots S1–S16 are selected in response to a random number generated in processor 205. As a result, the time interval ΔT1, ΔT2, and ΔT3 may vary between each message packet 400 transmitted from the tag system 120C. Accordingly, although message packets 400 transmitted from tag systems 120C and 120D may collide at time T1, subsequent message packets 400 transmitted from the tag systems 120C and 120D are not likely to be transmitted at the same time. Thus, numerous tag systems 120B transmitting at the same frequency may be used in close proximity to each other. As a result, the cost of the tag systems 120C–120E may be reduced because a variety of tag systems 120C–120E transmitting at different frequencies do not have to be provided. Further, the cost of the interrogator 300B may be reduced because it may be designed to receive transmissions at one frequency instead of multiple frequencies. Alternatively, the tag systems 120C–120E may transmit at different frequencies. In this case, the interrogator 300B would include circuitry to receive transmissions at different frequencies.

In an alternative embodiment, the tag system 120B may monitor the voltage level of the battery 170 (shown in FIG. 1) to determine how often to transmit a message packet 400. Typically, a charge is applied to the battery 170 when a vehicle 100 is in motion. In contrast, a reduced charge or no charge at all is applied to the battery 170 when the vehicle 100 is idling or turned off. Thus, the tag system 120B may monitor the difference between the voltage levels to determine whether the vehicle 100 is moving. The tag system 120B monitors the voltage level using data retrieved from bus 110 or from a direct connection to a sensor (not shown) coupled to the battery 170.

The tag system 120 may increase the transmission rate of the message packets 400 when the vehicle 100 is moving. In this way, a number of message packets 400 may be transmitted as the vehicle 100 passes through the designated area 20. Thus, the likelihood of the interrogator 300B receiving a message packet 400 is increased. The tag system 120B may decrease the transmission rate of the message packets 400 when the vehicle is not moving. In this way, a number of message packets 400 may be transmitted in the designated area 20 while reducing the total number of message packets 400 transmitted in a specific period of time. Thus, the likelihood of a collision between message packets 400 is reduced.

Returning to FIG. 1, the interrogator 300B receives data transmitted from the tag system 120B including the fuel data 420 and the odometer data 425 when the vehicle 100 enters the designated area 20. The VID 415, the odometer data 420, and the fuel data 425 are provided to the host computer 320 for storage and processing. In addition, the interrogator 320 receives the data transmitted from the driver tag system 120A.

The host computer 320 determines whether the vehicle 100 and the renter are "matched" based on the data transmitted from the tag system 120B and the driver tag system 120A. The renter and the vehicle 100 are matched if the stored data indicates that the renter has rented the vehicle 100 exiting the rental lot. If there is a match, the host computer provides a signal to access/exit system 30 to allow the vehicle 100 to exit the rental lot. If there is not a match, the renter is instructed to return to the rental lot for assistance.

In an alternative embodiment, a user interface 165 may be coupled to the bus 110 or directly to the tag system 120B. The user interface 165 may be used by the renter to enter an access code, credit card number, or other information which is acquired by the tag system 120B directly or from the bus 110. The user interface 165 may be, for example, a key pad, card reader, or other well known device for providing data to a system from an external source. In operation, for example, the user interface 165 may be used to acquire the renter's credit card number. The tag system 120B transmits the credit card number to the interrogator 300B. The credit card number is used to verify that the renter and the vehicle 100 match. If there is a match, the vehicle is allowed to leave the rental lot. If there is no match, the vehicle is not permitted to leave the lot.

After exiting the rental lot and upon returning to the rental lot or drop-off point, the interrogator 300B receives the message packet 400 transmitted from the tag system 120B. The host computer 320 compares the fuel data 420 and the odometer data 425 from the tag system 120B to the data stored in the database. The host computer 320 uses the difference between the fuel data 420 from the tag system 120B when the vehicle was exiting the rental lot to the fuel data 425 from the tag system 120B when the vehicle 100 is returned to the rental lot to determine if the renter should be charged for gasoline. Similarly, the odometer data 425 is utilized to determine if the renter should be charged for the mileage the vehicle has traveled. A receipt is generated and provided to the renter. The renter then parks the vehicle. Alternatively, the renter may receive the receipt after the vehicle is parked.

Figure 6:
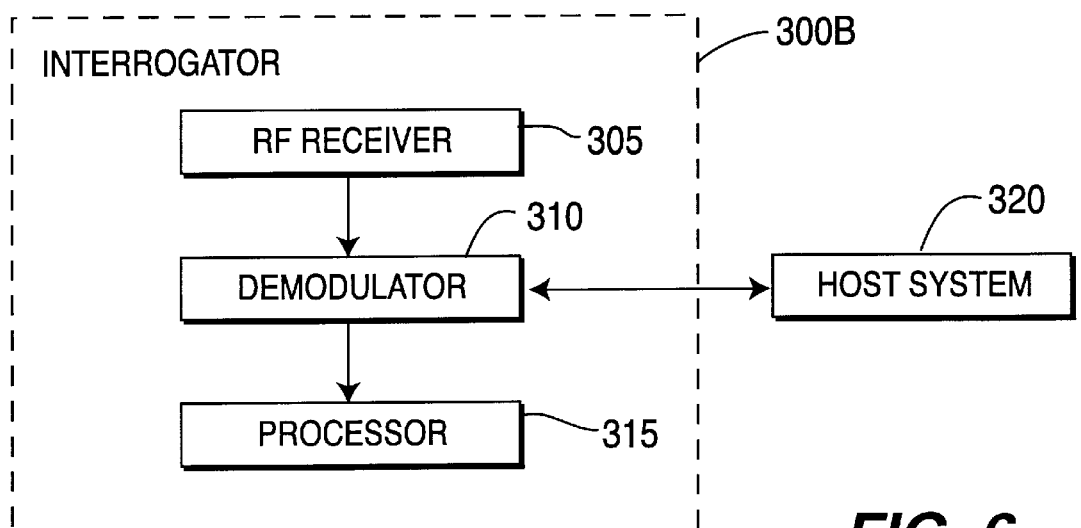
FIG. 6 is a block diagram of an interrogator 300B according to an exemplary embodiment of the present invention.

As is shown in FIG. 6, the transmitted message packet 400 (shown in FIG. 4) is received by interrogator 300B. The interrogator 300B includes an RF receiver 305 that receives the transmitted message packet 400. The received message packet 400 is provided to demodulator 310 that demodulates the received message packet 400. The processor 315 processes the received message packet and converts the data provided in the message packet 400 to a form suitable for use by the host computer 320.

Figure 9:
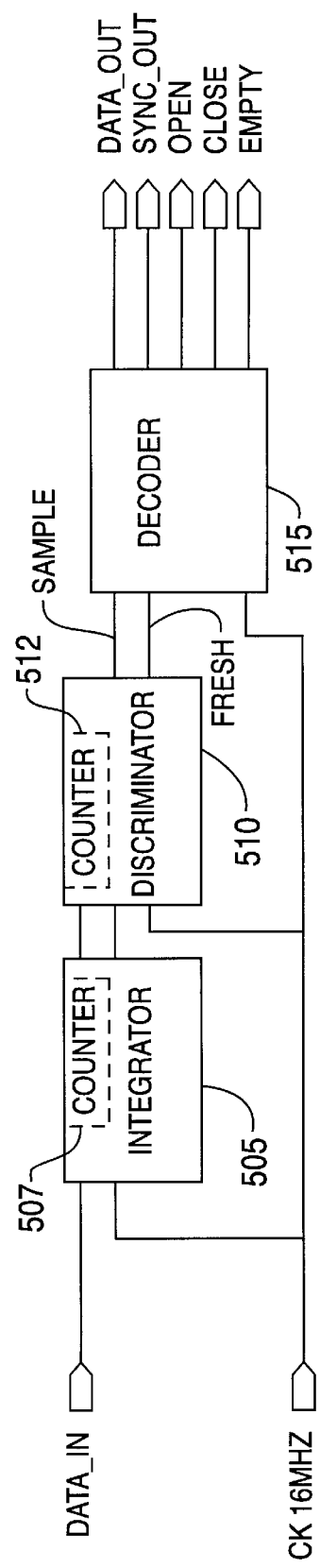
FIG. 9 is a block diagram of the processor 510 according to an exemplary embodiment of the present invention.

FIG. 9 is a block diagram of the processor 315. The processor 315 includes an integrator 505 that integrates the data over time. It has a maximum threshold MAX1 of, for example, 208 counts and a minimum threshold MIN1 of, for example, zero (0) counts. Moreover, it has a built-in hysteresis and a low-high threshold TRH of, for example, 187 counts, and a high-low threshold TRL of, for example, 21 counts. The above exemplary values are for a 9600 baud rate transmission. Every time one of these thresholds is reached, a "start" pulse is generated for synchronization of the subsequent circuitry. The demodulated signal DATA_IN is provided to the integrator 505 which implements an integration operation to reduce the effect of high frequency noise in the demodulated signal DATA_IN. In other words, the integrator 505 implements a low pass filter operation. The integrator 505 includes a counter 507 which counts up when the demodulated signal DATA_IN is high and counts down when the demodulated signal DATA_IN is low.

Figure 10:
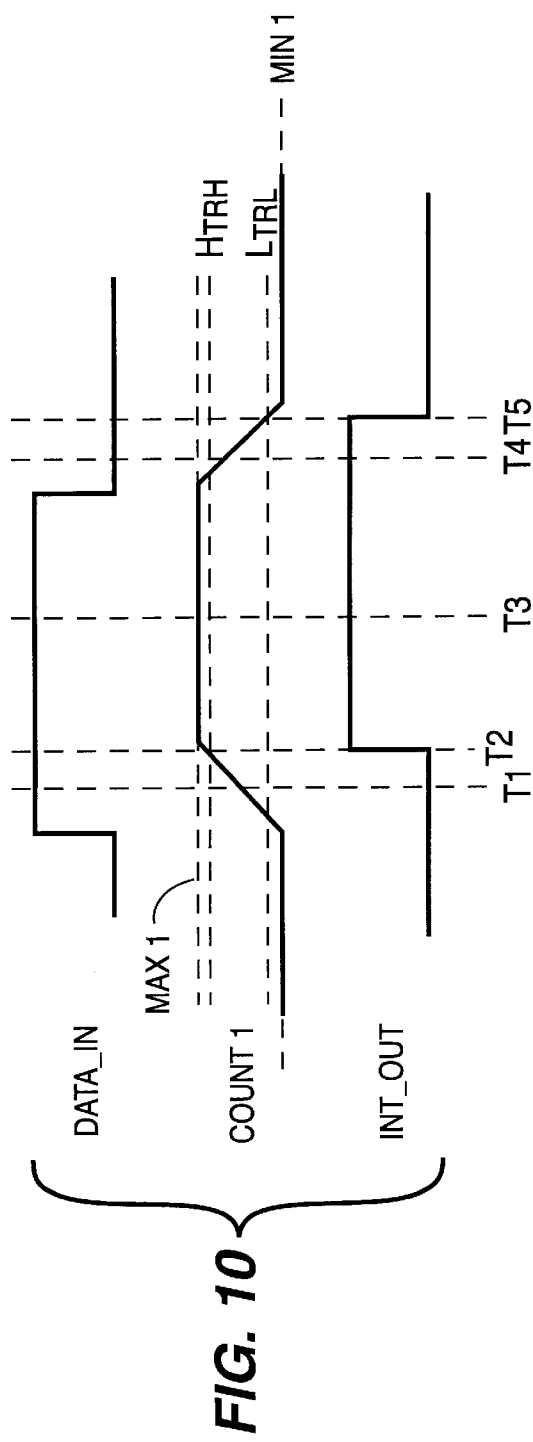
FIG. 10 is a timing diagram illustrating the operation of the integrator 505.

The operation of the integrator 505 is described below with reference to FIG. 10. At time T1, the counter 507 counts up because the data signal DATA_IN is high. The counter counts up to the maximum value MAX1. At time T4, when the data DATA_IN is low, the counter 507 counts down. The counter does not count lower than the minimum count value MIN1.

The integrator 505 utilizes the counter 507 to produce a data signal INT_OUT. The data signal INT_OUT transitions from a low to high state when the count exceeds a threshold value TRH. The threshold value TRH is, for example:

TRH=0.9*MAX1

Thus, at time T2, when the count COUNT1 is equal to or greater than the threshold value TRH, the data signal INT_OUT becomes high. The data signal INT_OUT transitions from a high to low state when the count is equal to a threshold value TRL. The threshold value TRL is, for example:

TRL=0.1*MAX1

Thus, at time T5, when the count value COUNT1 is equal to or less than the threshold value TRL, the data signal INT_OUT becomes low. In this way, high frequency components in the data signal DATA_IN are minimized. As a result, high frequency noise in the data signal DATA_IN is suppressed.

The integrator 505 shifts the data signal INT_OUT in time with respect to the demodulated signal. The integrator 505 does not significantly alter the duration of the pulses between the demodulated signal DATA_IN and the data signal INT_OUT.

Figure 11:
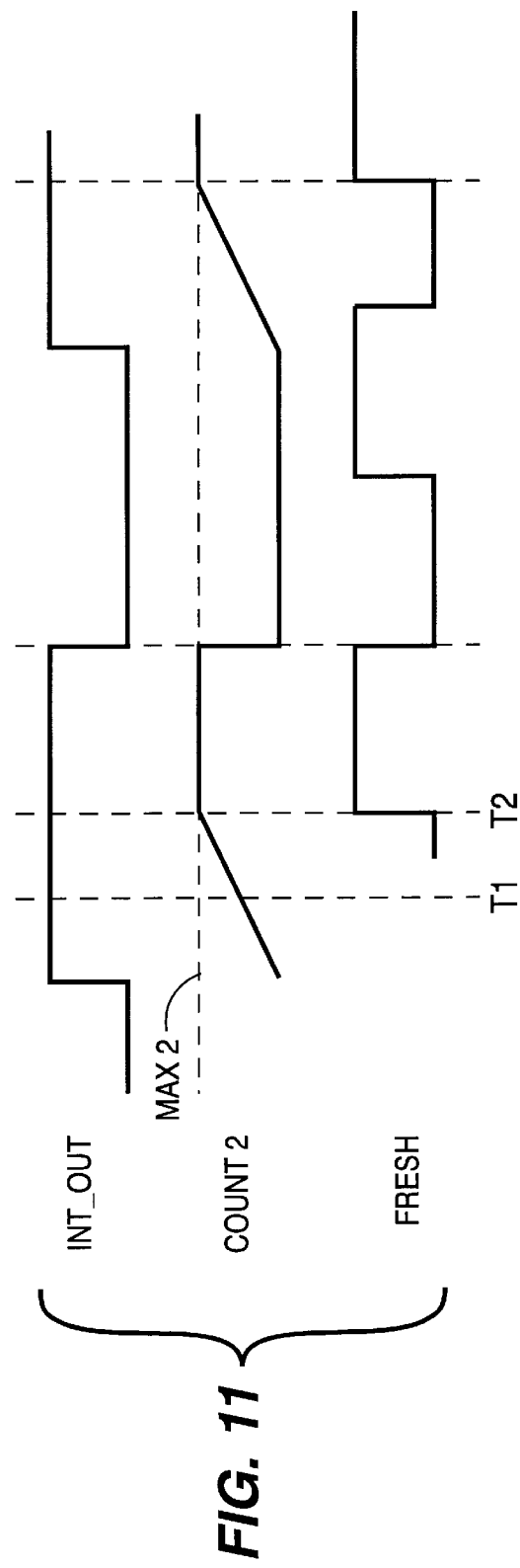
FIG. 11 is a timing diagram illustrating the operation of the discriminator 510.

Returning to FIG. 9, the processor 315 includes a discriminator 510 that differentiates between ones and zeros in the Manchester encoded data stream. The discriminator includes a re-triggerable counter modulo, for example, 416 with input value sampling at, for example, count 208. The discriminator 510 discriminates between ones and zeros in the Manchester encoded data in the data signal INT_OUT. The discriminator 510 also synchronizes the internal clock to the clock data in the Manchester encoded data. The operation of the discriminator 510 is described below with reference to FIG. 11. At time T1, a counter 512 located in discriminator 510 counts up because the data signal INT_OUT is high. The counter 512 counts up to a maximum value MAX2 and does not exceed the maximum value MAX2. The maximum value MAX2 is, for example, substantially equivalent to half the expected amplitude of the pulses in the data signal INT_OUT.

At time T2, when the count value COUNT2 is greater than or equal the maximum value MAX2, the signal FRESH transitions from a low to a high state. The transition from the low to high state is used to synchronize the clock to the Manchester encoded data. The signal produced by the counter 512 is provided as a data signal SAMPLE to the decoder 515. The data signal SAMPLE is either high or low. Thus, at time T1, the data signal SAMPLE is low. At time T2, the data signal SAMPLE is high. The rising edge of the data signal FRESH indicates that a valid data sample is provided in data signal SAMPLE. The counter 512 is set to, for example, zero (0) when the data signal INT_OUT transitions from a high to low state.

In response to the data signal FRESH and the data signal SAMPLE, the decoder decodes the Manchester encoded data to retrieve the message data packet 400 (shown in FIG. 4). The decoder 515 extracts the data from the message packet 400 and provides it to host computer 320. Alternatively, the decoder may provide the message packet 400 to the host computer 320 which extracts the data from the message data packet 400.

Figure 12:
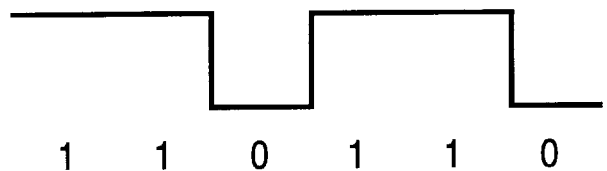
FIG. 12 is a diagram illustrating the start of frame sequence.

The decoder 515 receives the Manchester encoded data and converts it to a message packet 400. In order to convert the Manchester encoded data, the decoder 515 identifies the beginning and the end of the Manchester encoded data corresponding to the message packet. A start of frame sequence is added to the Manchester encoded data by the processor 205 during transmission. The start of frame sequence is shown in FIG. 12. The start of frame sequence is a series of pulses representing ones and zeros added at the beginning of the Manchester encoded message packet 400 (shown in FIG. 4). The start of frame sequence is a combination of zeros and ones that would not be produced when the message packet 400 is Manchester encoded.

Once the start of frame sequence is detected, the decoder 515 determines the beginning of the Manchester encoded message packet 400 and decodes it. The end of the Manchester encoded message packet 400 may be determined in two ways. If the number of bits of the Manchester encoded message packet 400 is known, the decoder 515 may count the number of bits after receipt of the start of frame sequence. Once the number of counted bits equals the number of bits in the Manchester encoded message packet, the decoder 515 ignores the remaining bits. Alternatively, an end of frame sequence may be added after the Manchester encoded data by the tag system 120.

Figure 13:
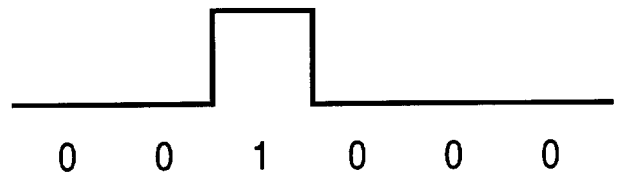
FIG. 13 is a diagram illustrating the end of frame sequence.
Figure 14:
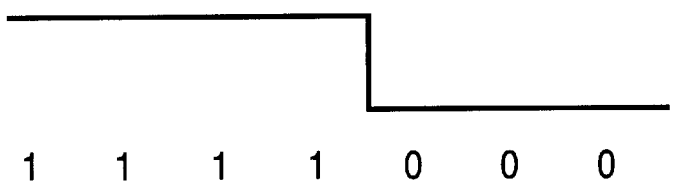
FIG. 14 is a diagram showing the format of an illegal Manchester code according to the prior art.

The end of frame sequence is shown in FIG. 13. The end of frame sequence is a series of pulses representing ones and zeros added at the end of the Manchester encoded message packet 400 (shown in FIG. 4) by the processor 205 during transmission. The end of frame sequence is a combination of zeros and ones that would not be produced when the message packet 400 is Manchester encoded. By using the start of frame sequence and the end of frame sequence, the boundaries of the message packet 400 may be determined by the decoder 515. Further, if a collision between messages packets occurs, one of the message packets may be detected and recovered by detecting the start of frame sequence. Further, the detection of a start of a second frame sequence indicates that the Manchester encoded data currently being decoded is invalid and should be ignored. In contrast, prior art systems utilize illegal Manchester codes to indicate the start of the encoded data. As a result, if a collision occurs between transmitted message packets 400 in the prior art systems, it may not be possible to recover either message packet 400.

By using the exemplary system, an increased bandwidth transmitter is not necessary to transmit the illegal Manchester sequence. Further, the RF receiver 305 may synchronize to the received signal because of the continued transitions between high and low data values in the received signal. Further, the energy of the transmitted signal over a period of time is increased. As a result, the RF receiver 305 may decrease its gain improving the signal to noise ratio. In addition, the size of the message packet 400 may be reduced as compared to the prior art because the number of bits in the start of frame sequence and end of frame sequence are reduced.

Once the decoder 515 retrieves the message packet 400, the decoder 515 provides the message packet to host computer 320. Alternatively, the processor 315 (shown in FIG. 6) may include additional circuitry and/or software for performing different operations that are implemented by the host computer 320.

The tag system 120B is protected from tampering such as being removed from the vehicle 100. If the tag system 120B is removed from the vehicle 100 it could be used to indicate that a vehicle was returned to the rental lot. The tag system 120B is protected from tampering by storing data such as the vehicle identification data in a volatile memory 730 in the tag system 120B. In this case, the tag system 120B is coupled to battery 170 (shown in FIG. 2). If the tag system 120B is removed, the tag system 120B is disconnected from the battery 170. Data stored in the volatile memory 730 within the tag system 120B is lost. For example, the vehicle identification data may be stored in the volatile memory 730. Upon re-applying battery power, the volatile memory 730 is initialized to indicate that the tag system 120B had been previously disconnected.

The car rental system employing the vehicle information system 10 simplifies and automates the process of renting, returning, and paying for rental vehicles especially in large facilities such as airports. Further, the number of individuals utilized at the rental location may be minimized. For example, the person stationed at the rental area exit may be eliminated and the number of personnel located at the rental and return desks may be reduced.

In an alternative embodiment, vehicle 100 may be located in reserved dedicated short-term parking places, for example, at the airport. An interrogator 300A is located on a walkway to the reserved parking locations. As the renter passes the interrogator 300A, the interrogator receives the data from the driver tag system 120A and determines which vehicle 100 is to be provided to the renter. Upon determining which vehicle 100 has been rented to the renter, the interrogator 300A includes a display and/or speaker system for informing the renter of the location of the vehicle 100.

Another interrogator 300B next to the vehicle 100 receives the data packet from the driver tag system 120A and releases the keys for the vehicle 100. The interrogator 300B also activates the ignition of the vehicle 100 so that it can be started using the keys. The reserved locations may be positioned around the short and long term parking areas as well as near rail road, cab, and bus connections.

When the vehicle is returned to the reserved parking, the interrogator 300B receives the VID, mileage and fuel level data from the tag system 120B and relays this information to the central computer as described above. The renter leaves the vehicle 100, approaches the interrogator 300B where his tag is read. A key box is opened and the interrogator 300B disables the vehicle's ignition. The keys are then placed in the box, the box closed, and a receipt is printed. The host computer 320 also notifies a person to retrieve the vehicle 100. This embodiment eliminates the necessity of boarding a shuttle when picking up or dropping off the vehicle 100.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An encoding system comprising:
    means for Manchester encoding a data value to produce a coded data value;
    means for producing a first invalid Manchester encoded sequence as a start of frame code, the start of frame code consists of a valid Manchester code and a sequence of "1"s and "0"s, wherein the sequence of "1"s and "0"s has no more than two consecutive "1"s; and
    means for producing a transmission packet including the start of frame code followed by the coded data value.

2. The encoding system according to claim 1 wherein the start of frame code is a sequence of "101110".

3. The encoding system according to claim 1 further comprising:
    means for producing a second invalid Manchester encoded sequence as an end of frame code; and
    means for including the end of frame code in the transmission packet after the coded data value.

4. The encoding system according to claim 3 wherein the end of frame code is a sequence of "001000".

5. The encoding system according to claim 1 wherein means for producing said transmission packet comprises an end of frame code including a valid Manchester code.

6. An encoding system comprising:
    means for Manchester encoding a data value to produce a coded data value;
    means for producing a first invalid Manchester encoded sequence as a start of frame code, the start of frame code consists of a valid Manchester code and a sequence of "1"s and "0"s, wherein the sequence of "1"s and "0"s has no more than two consecutive "1"s;
    means for producing a second invalid Manchester encoded sequence as an end of frame code, the end of frame code includes a valid Manchester code; and
    means for producing a transmission packet including the start of frame code followed by the coded data value followed by the end of frame code.

7. The encoding system according to claim 6 wherein the end of frame code is a sequence of "001000".

8. The encoding system according to claim 6 wherein the start of frame code is a sequence of "110110".

9. A decoding system comprising:
    receiving means for receiving a first Manchester encoded signal including a first start of frame code followed by first coded data values, the first start of frame code is a first invalid Manchester encoded sequence consisting of a valid Manchester code and a sequence of "1"s and "0"s, wherein the sequence of "1"s and "0"s has no more than two consecutive "1"s; and
    means for detecting the first start of frame code to determine a beginning of the first coded data values in the first Manchester encoded signal.

10. The decoding system according to claim 9 wherein the first start of frame code is a sequence of "110110".

11. The decoding system according to claim 9 wherein the first Manchester encoded signal includes a first end of frame code following the first coded data values, the first end of frame code includes a valid Manchester code, and the decoding system further comprises means for detecting the first end of frame code to determine an end of the first coded data values in the first Manchester encoded signal.

12. The decoding system according to claim 11 wherein the first end of frame code is a sequence of "001000".

13. The decoding system according to claim 11 wherein the receiving means includes means for receiving a second Manchester encoded signal including a second start of frame code followed by second coded data values, the second start of frame code is a valid Manchester code and the decoding system further comprises means for determining that the first Manchester encoded signal is invalid if the second start of frame code is received before the first end of frame code.

* * * * *

UNITED STATES PATENT AND TRADEMARK OFFICE
CERTIFICATE OF CORRECTION

PATENT NO. : 6,064,705
DATED : May 16, 2000
INVENTOR(S) : Peter F. Zalud, et al.

It is certified that error appears in the above-indentified patent and that said Letters Patent is hereby corrected as shown below:

Claim 2, line 2: replace "101110" with --110110--

Signed and Sealed this

Twenty-seventh Day of March, 2001

NICHOLAS P. GODICI

Attest:

Attesting Officer   Acting Director of the United States Patent and Trademark Office